US011530137B2

(12) United States Patent
Luke et al.

(10) Patent No.: US 11,530,137 B2
(45) Date of Patent: Dec. 20, 2022

(54) ACIDIC FERRATE COMPOSITION AND METHODS OF MAKING FERRATE

(71) Applicant: Phosphorus Free Water Solutions, LLC, Lakeland, FL (US)

(72) Inventors: Donald A. Luke, Valrico, FL (US); Ruben D. Durand-Diaz, Brandon, FL (US); Brent Canham, Lakeland, FL (US); David Velazquez Torres, Lakeland, FL (US)

(73) Assignee: Phosphorus Free Water Solutions, LLC, Lakeland, FL (US)

( * ) Notice: Subject to any disclaimer, the term of this patent is extended or adjusted under 35 U.S.C. 154(b) by 166 days.

(21) Appl. No.: 16/650,954

(22) PCT Filed: Oct. 1, 2018

(86) PCT No.: PCT/US2018/053745
§ 371 (c)(1),
(2) Date: Mar. 26, 2020

(87) PCT Pub. No.: WO2019/070576
PCT Pub. Date: Apr. 11, 2019

(65) Prior Publication Data
US 2020/0270145 A1    Aug. 27, 2020

Related U.S. Application Data

(60) Provisional application No. 62/566,867, filed on Oct. 2, 2017.

(51) Int. Cl.
*C01G 49/00* (2006.01)
*C02F 1/72* (2006.01)
*C02F 1/76* (2006.01)
C02F 101/10 (2006.01)

(52) U.S. Cl.
CPC ............ *C01G 49/0081* (2013.01); *C02F 1/72* (2013.01); *C02F 1/76* (2013.01); *C02F 2101/105* (2013.01)

(58) Field of Classification Search
CPC ....... C01G 49/0081; A61K 33/26; C02F 1/72; C02F 9/04; C02F 103/20
See application file for complete search history.

(56) References Cited

U.S. PATENT DOCUMENTS

| 4,017,388 | A | 4/1977 | Albertson |
|---|---|---|---|
| 4,689,154 | A | 8/1987 | Zimberg |
| 5,759,401 | A | 6/1998 | Boussely et al. |
| 5,833,856 | A | 11/1998 | Liu et al. |
| 5,876,606 | A | 3/1999 | Blowes et al. |
| 6,387,254 | B1 | 5/2002 | Takechi et al. |
| 6,623,642 | B2 | 9/2003 | Robertson |
| 6,770,205 | B1 | 8/2004 | Schroder et al. |
| 7,399,416 | B2 | 7/2008 | Moller et al. |
| 7,563,373 | B2 | 7/2009 | Bolduc |
| 7,662,206 | B2 | 2/2010 | Burnham |
| 7,947,104 | B2 | 5/2011 | Burnham et al. |
| 8,202,342 | B2 | 6/2012 | Burnham |
| 8,449,756 | B2 | 5/2013 | Monzyk et al. |
| 8,721,885 | B2 | 5/2014 | Drizo et al. |
| 8,754,004 | B2 | 6/2014 | Penn |
| 9,822,024 | B2 | 11/2017 | Meng et al. |
| 11,267,733 | B2 | 3/2022 | Luke et al. |
| 2003/0146169 | A1 | 8/2003 | Ciampi et al. |
| 2003/0217968 | A1 | 11/2003 | Goel et al. |
| 2004/0253171 | A1 | 12/2004 | Cojan et al. |
| 2005/0053543 | A1 | 3/2005 | Kneip et al. |
| 2005/0271575 | A1 | 12/2005 | Ciampi et al. |
| 2009/0216060 | A1 | 8/2009 | Monzyk et al. |
| 2012/0211426 | A1 | 8/2012 | Santoro et al. |
| 2013/0092532 | A1 | 4/2013 | Monzyk et al. |
| 2013/0098840 | A1 | 4/2013 | Helferich et al. |
| 2013/0175224 | A1 | 7/2013 | Ciampi et al. |
| 2016/0031732 | A1 | 2/2016 | Ciampi et al. |
| 2016/0326011 | A1 * | 11/2016 | Ma ..................... C01G 49/0081 |
| 2020/0247699 | A1 | 8/2020 | Luke et al. |

FOREIGN PATENT DOCUMENTS

| CN | 102167460 B | 7/2012 | |
|---|---|---|---|
| CN | 103626276 A | 3/2014 | |
| CN | 105417672 A | 3/2016 | |
| CN | 105692964 A | 6/2016 | |
| CN | 105967293 A | 9/2016 | |
| CN | 105967384 A * | 9/2016 | ............... C02F 9/00 |
| CN | 106335960 A | 1/2017 | |
| CN | 104828924 B | 5/2017 | |
| CN | 106669633 A | 5/2017 | |
| CN | 106929875 A * | 7/2017 | ............... C25B 1/00 |
| CN | 108128925 A | 6/2018 | |
| WO | WO-03050043 A2 | 6/2003 | |
| WO | WO-2014200771 A1 | 12/2014 | |
| WO | WO-2016145487 A1 | 9/2016 | |
| WO | WO-2019070574 A1 | 4/2019 | |
| WO | WO-2019070576 A1 | 4/2019 | |

OTHER PUBLICATIONS

Machine translation of CN-105967384-A.*
Translation of CN 106929875.*
Translation of CN 105967384.*
"International Application Serial No. PCT/US2018/053742, International Search Report dated Dec. 3, 2018", 2 pgs.
"International Application Serial No. PCT/US2018/053742, Written Opinion dated Dec. 3, 2018", 7 pgs.
"International Application Serial No. PCT/US2018/053745, International Search Report dated Nov. 30, 2018", 2 pgs.
"International Application Serial No. PCT/US2018/053745, Written Opinion dated Nov. 30, 2018", 6 pgs.

(Continued)

*Primary Examiner* — Haidung D Nguyen
(74) *Attorney, Agent, or Firm* — Schwegman Lundberg & Woessner, P.A.

(57) ABSTRACT

Various embodiments relate to an acidic ferrate composition and methods of making ferrate. A method of forming ferrate includes treating an iron source with an oxidizer in an aqueous solution having a pH of less than 7 under conditions sufficient to form ferrate.

13 Claims, No Drawings

(56) References Cited

OTHER PUBLICATIONS

Melia, et al., "Trends in the recovery of phosphorus in bioavailable forms from wastewater", Kingston University London Research Repository,, [Online] Retrieved from the internet: <https://eprints.kingston.ac.uk/38767>, (Aug. 9, 2017), 1-48.

Menar, A., et al., "Calcium Phosphate Precipitation in Wastewater Treatment", Sanitary Engineering research Laboratory, University of California, Berkeley, California, SERL Report No. 72-6, (Jun. 1972), 99 pgs.

"International Application Serial No. PCT US2018 053745, International Preliminary Report on Patentability dated Apr. 16, 2020", 8 pgs.

"International Application Serial No. PCT US2018 053742, International Preliminary Report on Patentability dated Apr. 16, 2020", 9 pgs.

"U.S. Appl. No. 16/650,945, Non Final Office Action dated Aug. 20, 2021", 13 pgs.

"U.S. Appl. No. 16/650,945, Notice of Allowance dated Nov. 9, 2021", 7 pgs.

"U.S. Appl. No. 16/650,945, Response filed Oct. 28, 2021 to Non Final Office Action dated Aug. 20, 2021", 14 pgs.

Weixuan, et al., "New Technology for removing phosphrus in livestock and poultry breeding wastewater", English Translation CN 105692964, (Jun. 22, 2016), 5 pgs.

\* cited by examiner

ACIDIC FERRATE COMPOSITION AND METHODS OF MAKING FERRATE

CROSS-REFERENCE TO RELATED APPLICATION

This application is a U.S. National Filing Stage Filing under 35 U.S.C. 371 from International Patent Application Serial No. PCT/US2018/053745, filed Oct. 1, 2018. published on Apr. 11, 2019 as WO2019/070576 A1, which application claims the benefit of priority to U.S. Provisional Patent Application Serial No. 62/566,867 filed Oct. 2, 2017, the disclosures of which are incorporated herein in their entireties by reference.

BACKGROUND

Ferrate is the inorganic anion with the chemical formula $[FeO_4]^{2-}$. Ferrate is one of the most powerful water oxidation treatment chemicals known, yet it is environmentally friendly, generating the relatively benign oxidation-byproduct ferric oxide. Current ferrate compositions suffer from low ferrate concentration, low stability of ferrate (e.g., rapid degradation), and highly basic pH. Current methods of making ferrate suffer from low yield, poor efficiency, and a need for proximity to a site of oxidation to maintain oxidative activity of the ferrate prior to use.

SUMMARY OF THE INVENTION

Various embodiments of the present invention provide a method of making ferrate. The method includes treating an iron source with an oxidizer in an aqueous solution having a pH of less than 7 under conditions sufficient to form ferrate.

Various embodiments of the present invention provide a method of making ferrate. The method includes treating ferric chloride with an oxidizer in an aqueous solution including HCl and having a pH of about 1 to about 5 under conditions sufficient to form ferrate, wherein the ferric chloride and the oxidizer have a molar ratio of about 1:1 to about 1:3.

Various embodiments of the present invention provide a method of making ferrate. The method includes treating ferric chloride with potassium permanganate in an aqueous solution under conditions sufficient to form ferrate.

Various embodiments of the present invention provide a ferrate composition that is formed by an embodiment of the method of making ferrate of the present invention. For example, the ferrate composition can be formed by a method including treating an iron source with an oxidizer in an aqueous solution having a pH of less than 7 under conditions sufficient to form ferrate, or treating ferric chloride with potassium permanganate in an aqueous solution under conditions sufficient to form ferrate.

In various embodiments, the present invention provides an aqueous ferrate composition including ferrate. The aqueous ferrate composition has a pH of less than 7.

In various embodiments, the present invention provides an aqueous ferrate composition including ferrate. The aqueous ferrate composition has a pH of 1 to about 5. The ferrate is about 200,000 ppm to about 400,000 ppm of the aqueous ferrate composition. The ferrate retains at least 50% of its oxidative activity, on a mass basis, after about 5 to about 7 days at room temperature.

In various embodiments, the method of forming ferrate of the present invention can provide ferrate in a form that is more stable and that degrades more slowly than other forms of ferrate. The greater stability can allow for storage and transport of ferrate to a site of use with little to no degradation of oxidative activity. In various embodiments, the method of forming ferrate of the present invention can provide a ferrate composition that can be used for oxidative treatments under acidic or neutral conditions, which can allow the ferrate to perform as an oxidizer with greater efficiency (e.g., greater oxidative potential) than other methods for oxidizing using ferrate. In various embodiments, the method of the present invention can include forming ferrate under acidic conditions, providing a simpler and more convenient ferrate synthesis, a higher yield of the ferrate, a higher concentration of the ferrate, or higher oxidative activity of the ferrate, as compared to other ferrate synthesis procedures such as basic ferrate synthesis procedures. In various embodiments, surprisingly, ferrate is stable in an acidic environment.

In various embodiments, the method of forming ferrate of the present invention generates ferrate in a form that is more concentrated than other forms of ferrate, allowing for more facile storage and transport of the ferrate, and more efficient use of space. In various embodiments, the higher concentration of the ferrate can allow smaller amounts of the ferrate composition to oxidize a given amount of material, affecting the environment of the material being oxidized less (e.g., less effect on pH) than the addition of less concentrated forms of ferrate, such as highly basic and dilute ferrate compositions which can cause a large raise in pH in an aqueous composition being oxidatively treated. In various embodiments, the higher concentration of ferrate can decrease contamination of the material being oxidized by other materials that may be present in the solution containing the ferrate.

In various embodiments, the method of forming ferrate of the present invention can provide ferrate in a form that has a greater oxidation potential than other forms of ferrate, allowing use of a lower addition rate of the ferrate to achieve an equivalent or greater amount of oxidation as compared to higher addition rates of less active forms of ferrate. In various embodiments, the method of the present invention can include using ferrate at a lower concentration than other methods (e.g., at least partially due to the ferrate having a higher oxidation potential under acidic conditions as compared to basic conditions), allowing the pH of the water including the oxidizable material being treated with the ferrate to remain nearly the same before and after treatment, contrasting with other forms of ferrate that must be used at higher concentration and that correspondingly affect the pH of the water being treated to a higher degree. In various embodiments, the production of a stable, high concentration, acidic form of ferrate eliminates the need for on-site synthesis capability, reduces the capital and operating cost of treatment and further eliminates the need for on-site storage of feedstock chemicals in environmentally sensitive locations where the water treatment may occur. The use of lower concentrations of ferrate can reduce the concentration of iron in the ferrate-treated water.

DETAILED DESCRIPTION OF THE INVENTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range. The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that the composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

Method of Making Ferrate.

The present invention provides a method of making an oxidizing combination of materials or an oxidizer such as ferrate. The method can include treating an iron source with an oxidizer in an aqueous solution. The method can include treating the iron source with the oxidizer in an aqueous solution (e.g., a ferrate starting material mixture) having a pH of less than 7 (e.g., an acidic aqueous solution) under conditions sufficient to form the oxidizing combination of materials, or oxidizer such as ferrate, such as a pH of about 1 to less than about 7, or about 2 to about 6, or about 1 to about 5, or about 1 to about 4, or about 1 to about 3, or about 1.5 to about 3, or about 1.5 to about 2.5, or about 1 or less, or less than, equal to, or greater than about 1.5, 2, 2.5, 3, 3.5, 4, 4.5, 5, 5.5, 6, or about 6.5 or more. The method can include treating ferric chloride with potassium permanganate in an aqueous solution under conditions sufficient to form the oxidizing combination of materials or oxidizer, such as to form ferrate. Throughout this application, ferrate is described as a material formed upon treatment of the iron source with the oxidizer in the acidic solution; however, in some embodiments, a different oxidizing combination of materials or oxidizer can be produced by the method in addition to or as an alternative to ferrate. All methods of forming ferrate herein are also to be interpreted as possible ways of forming an oxidizing combination of materials or oxidizer including non-ferrate oxidizers alternatively or in addition to ferrate. All solutions described herein as including ferrate can be interpreted as instead including an oxidizing combination of materials or oxidizer including non-ferrate oxidizers alternatively or in addition to ferrate.

During the treatment of the iron source with the oxidizer in the aqueous solution, the aqueous solution including the iron source and the oxidizer (e.g., the ferrate starting material mixture) can have any suitable mole ratio of the iron source to the oxidizer, such that the ferrate is formed as described herein. For example, the aqueous solution including the iron source and the oxidizer can have a mole ratio of the oxidizer to the iron source of about 1:100 to about 100:1, about 1:5 to about 5:1, about 1:1 to about 1:3, or about 1:100 or less, or less than, equal to, or greater than about 1:50, 1:25, 1:10, 1:5, 1:4, 1:3, 1:2, 1:1, 2:1, 3:1, 4:1, 5:1, 10:1, 25:1, 50:1, or about 100:1 or more.

The oxidizer can be any one or more suitable oxidizers that can form ferrate from the iron source. For example, the oxidizer can be or can include ferric chloride ($FeCl_3$), potassium permanganate, potassium dichromate, potassium chlorate, potassium persulfate, sodium persulfate, perchloric acid, peracetic acid, potassium monopersulfate, hydrogen peroxide, sodium hypochlorite, potassium hypochlorite, ozone, or a combination thereof. The oxidizer can be potassium permanganate. The one or more oxidizers can be any suitable proportion of the total amount of the oxidizer and the iron source in the aqueous solution, such as about 10 wt % to about 60 wt % of the total amount of the oxidizer and the iron source, or about 25 wt % to about 40 wt %, or about 10 wt % or less, or less than, equal to, or greater than about 15, 20, 25, 26, 28, 30, 32, 34, 36, 38, 40, 45, 50, 55, or about 60 wt % or more.

The iron source can be any one or more suitable sources of iron for formation of ferrate upon treatment with the oxidizer. The iron source can be or can include ferric chloride ($FeCl_3$), ferric bromide, ferrous chloride, ferrous bromide, ferric nitrate, ferrous nitrate, ferric sulfate, ferrous sulfate, ferric phosphate, ferrous phosphate, ferric oxides, ferrous oxides, ferric carbonate, ferrous carbonate, or a combination thereof. The iron source can be ferric chloride (FeCl$_3$). The one or more iron sources can be any suitable proportion of the total amount of the oxidizer and the iron source in the aqueous solution, such as about 40 wt % to about 90 wt % of the total amount of the oxidizer and the iron source, about 60 wt % to about 70 wt %, or about 40 wt % or less, or less than, equal to, or greater than about 45 wt %, 50, 55, 60, 62, 64, 66, 68, 70, 75, 80, 85, or about 90 wt % or more.

The aqueous solution including the iron source and the oxidizer during the treatment of the iron source with the oxidizer to form the ferrate can be a ferrate starting material mixture. The ferrate starting material mixture can further include an acid. The acid can be any one or more suitable acids, such as a mineral acid, an organic acid, or a combination thereof. The acid can be or can include phosphoric acid, sulfuric acid, hydrochloric acid, acetic acid, or a combination thereof. The acid can be hydrochloric acid. Sufficient acid can be present to cause the pH of the ferrate starting material mixture to be at a desired level or range, such as about 1 to less than about 7, or about 2 to about 6, or about 1 to about 5, or about 1 to about 4, or about 1 to about 3, or about 1.5 to about 3, or about 1.5 to about 2.5, or about 1 or less, or less than, equal to, or greater than about 1.5, 2, 2.5, 3, 3.5, 4, 4.5, 5, 5.5, 6, or about 6.5 or more. The one or more acids can be acids that are added to the aqueous solution, or can be acids that form upon dissolution of other materials in the mixture, such as the iron source, such as FeCl$_3$ (e.g., which can dissolve in water to form HCl). In another example, an aqueous FeCl$_3$ solution can be prepared by dissolving iron metal in HCl, and then the aqueous FeCl$_3$ solution can be combined with potassium permanganate to form the aqueous solution including the iron source and the oxidizer.

Any suitable proportion of the ferrate starting material mixture (e.g., the aqueous solution including the iron source and the oxidizer) can be solvent, such as water, water miscible solvents such as (C$_1$-C$_5$)alcohols, or a combination thereof. A majority of the ferrate starting material mixture can be water. The solvent can be about 0 wt % to about 99.999 wt % of the ferrate starting material mixture, or about 10 to about 95 wt %, or about 50 wt % to about 80 wt % of the ferrate starting material mixture, or about 1 wt % or less, or less than, equal to, or greater than about 2 wt %, 3, 4, 5, 10, 20, 30, 40, 50, 60, 70, 80, 90, 95, 96, 97, 98, 99, 99.9, 99.99 wt %, or about 99.999 wt % or more.

The method can include allowing the ferrate starting material mixture to react at room temperature, heating the ferrate starting material mixture, or allowing the ferrate starting material mixture to heat (e.g., via exothermic reaction to form the ferrate). During the reaction to form the ferrate, the ferrate starting material mixture can have any suitable temperature (e.g., as maintained via no heating, heating, exothermic reaction, or a combination thereof), such as about 1° C. to about 500° C., about 5° C. to about 100° C., about 5° C. to about 40° C., about 10° C. to about 30° C., or about 1° C. or less, or less than, equal to, or greater than about 5° C., 10, 15, 16, 17, 18, 19, 20, 21, 22, 23, 24, 25, 26, 27, 28, 29, 30, 35, 40, 45, 50, 55, 60, 65, 70, 75, 80, 85, 90, 95, 100, 110, 120, 150, 175, 200, 250, 300, 400° C., or about 500° C. or more. The temperature can be maintained for any suitable amount of time, such as about 1 s to about 24 h, or about 10 s to about 8 h, or about 10 min to about 2 h, or about 30 min to about 70 minutes, or about 40 minutes to about 60 minutes, or about 1 s or less, or less than, equal to, or greater than about 10 s, 30 s, 1 min, 5, 10, 15, 20, 30, 40, 50 min, 1 h, 2, 3, 4, 5, 6, 7, 8, 9, 10, 12, 14, 16, 18, 20, 22, or about 24 h or more.

The method of making ferrate can form an aqueous composition including the generated ferrate. The aqueous composition including the ferrate can have a pH that is similar or equal to the pH of the solution during treatment of the iron source with the oxidizer, such as a pH of about 1 to less than about 7, or about 2 to about 6, or about 1 to about 5, or about 1 to about 4, or about 1 to about 3, or about 1.5 to about 3, or about 1.5 to about 2.5, or about 1 or less, or less than, equal to, or greater than about 1.5, 2, 2.5, 3, 3.5, 4, 4.5, 5, 5.5, 6, or about 6.5 or more. The pH ranges given in this paragraph refer to the initial pH of the aqueous composition upon synthesis of the ferrate from the iron source and the oxidizer. The pH of the aqueous composition including the ferrate can be affected by dilution with additional water or by addition of other materials to the aqueous composition (e.g., acid or base).

The aqueous composition including the generated ferrate can have any suitable concentration of ferrate. Ferrate exists in solution as a charge-balanced material including any one or more suitable counterions, such as sodium ferrate, potassium ferrate; however, ferrate concentrations given herein refer to the concentration of the ferrate ion itself rather than the ferrate salt including the ferrate counterion. About 0.001 ppm to about 999,999 ppm of the aqueous composition can be ferrate (wherein all ppm herein are ppm by weight unless otherwise indicated), about 20,000 ppm to about 700,000 ppm, about 200,000 ppm to about 500,000 ppm, or about 0.001 ppm or less, or less than, equal to, or greater than about 0.005 ppm, 0.01, 0.05, 0.1, 0.5, 1, 2, 3, 4, 5, 10, 15, 20, 25, 30, 40, 50, 60, 70, 80, 90, 100, 110, 120, 130, 140, 150, 160, 170, 180, 190, 200, 210, 220, 230, 240, 250, 300, 400, 500, 750, 1,000, 5,000, 1,000, 20,000, 50,000, 100,000, 200,000, 250,000, 300,000, 350,000, 400,000, 450,000, 500,000, 550,000, 600,000, 700,000, 800,000, 900,000, or about 999,999 ppm or more. The concentration ranges given in this paragraph refer to the initial concentration of the ferrate in the aqueous composition upon synthesis of the ferrate from the iron source and the oxidizer. The concentration of the ferrate in the aqueous composition including the ferrate can be affected by dilution with additional water or by addition or other materials to the aqueous composition that react with the ferrate.

The method of forming ferrate from the iron source and the oxidizer can have any suitable yield of ferrate. For example, the ferrate can be formed from the iron source with a yield of about 0.01% to about 100%, or about 40% to about 90%, or about 60% to about 95%, or about 50% to about 70%, or about 0.01% or less, or less than, equal to, or greater than about 0.05%, 0.1, 0.5, 1, 2, 3, 4, 5, 6, 8, 10, 12, 14, 16, 18, 20, 25, 30, 35, 40, 45, 50, 55, 60, 65, 70, 75, 80, 85, 86, 88, 90, 92, 94, 95, 96, 97, 98, 99, 99.9% or about 99.99% or more.

The method of forming ferrate from the iron source and the oxidizer can have any suitable selectivity toward ferrate. For example, the ferrate can be formed from the iron source with a selectivity of about 0.01% to about 100% of the iron source consumed is converted to ferrate on a molar basis, or about 60% to about 100%, or less than, equal to, or greater than about 0.05%, 0.1, 0.5, 1, 2, 3, 4, 5, 6, 8, 10, 12, 14, 16, 18, 20, 25, 30, 35, 40, 45, 50, 55, 60, 65, 70, 75, 80, 85, 86, 88, 90, 92, 94, 95, 96, 97, 98, 99, 99.9% or about 99.99% or more.

The method can include treating ferric chloride with potassium permanganate in an aqueous solution having any suitable pH (e.g., acidic, neutral, or basic) under conditions sufficient to form ferrate, such as a pH of about 1 to about 14, or about 1 to about 6, or about 2 to about 5, or about 1 or less, or less than, equal to, or greater than about 2, 3, 4, 5, 6, 7, 8, 9, 10, 11, 12, 13, or about 14 or more.

Oxidation with the Ferrate.

In various embodiments, the present invention provides a method of oxidizing an oxidizable material with ferrate. The ferrate used for the oxidation can be ferrate formed via an embodiment of the method of making ferrate described herein, wherein the onset of the method of oxidizing can occur after ferrate is formed or optionally the method of oxidizing also includes forming the ferrate. The ferrate can be ferrate from an embodiment of the acidic ferrate composition described herein.

Oxidizing with the ferrate can include contacting the ferrate and an oxidizable material, such as in an aqueous solution, to form an oxidized material. The oxidizable material can be any suitable oxidizable material, and can be in the form of an elemental material, an organic compound, an inorganic compound, or a combination thereof. The form of the oxidizable material can be a solid, or can be dissolved in solution. The oxidizable material can be phosphorus, bacteria (e.g., cyanobacteria that creates toxins in algae blooms), other organic material (e.g., plant or animal organic remnants), or a combination thereof.

The oxidizable material can be phosphorus, such as an aqueous solution of phosphorus, to which the ferrate is added. The phosphorus can be in the form of elemental phosphorus, inorganic phosphorus, organic phosphorus, a dissolved form of phosphorus, a solid form of phosphorus, or a combination thereof. The phosphorus in the water can be oxidized or non-oxidized prior to treatment with the ferrate, wherein oxidized phosphorus is oxidized to a higher oxidation state by the ferrate or at least some unoxidized phosphorus is oxidized by the ferrate to increase the concentration of oxidized ferrate. The phosphorus in the water can have a concentration of about 0.001 ppm to about 10,000 ppm, about 0.01 ppm to about 1,000 ppm, about 0.01 to 20 ppm, about 0.05 ppm to about 10 ppm, about 0.05 ppm to about 1 ppm, about 1 ppm to about 10 ppm, or about 0.001 ppm or less, or less than, equal to, or greater than about 0.005 ppm, 0.01, 0.05, 0.1, 0.2, 0.4, 0.6, 0.8, 1, 1.2, 1.4, 1.6, 1.8, 2, 2.5, 3, 3.5, 4, 4.5, 5, 6, 7, 8, 9, 10, 20, 30, 40, 50, 75, 100, 150, 200, 250, 500, 1,000, 2,500, 5,000 ppm, or about 10,000 ppm or more.

The contacting of the ferrate and the oxidizable material can occur in a reaction mixture that includes the ferrate and the oxidizable material, such as an aqueous solution including water and optionally water miscible solvents such as ($C_1$-$C_5$)alcohols. A majority of the reaction mixture can be water. The water can be about 0 wt % to about 99.999 wt % of the reaction mixture, or about 10 to about 95 wt %, or greater than about 2 wt %, 3, 4, 5, 10, 20, 30, 40, 50, 60, 70, 80, 90, 95, 96, 97, 98, 99, 99.9, 99.99 wt %, or about 99.999 wt % or more.

The reaction mixture including the ferrate and the oxidizable material can have any suitable pH during treatment to oxidize the oxidizable material, such as about 1 to about 14, about 1 to less than about 7, or about 2 to about 6, or about 1 to about 5, or about 1 to about 4, or about 1 to about 3, or about 1.5 to about 3, or about 1.5 to about 2.5, or about 5 to about 7, about 6.5 to about 7, or about 1 or less, or less than, equal to, or greater than about 1.5, 2, 2.5, 3, 3.5, 4, 4.5, 5, 5.5, 6, 6.5, 7, 8, 9, 10, 11, 12, 13, or about 14 or more.

The ferrate can be used at any suitable concentration in the reaction mixture, such that a desired amount of the oxidizable material is oxidized by the ferrate at a desired rate. For example, the ferrate can be about 0.001 ppm to about 1,000 ppm of the reaction mixture including the ferrate and the oxidizable material (e.g., ferrate with any one or more suitable counterions, such as sodium ferrate, potassium ferrate, wherein the ferrate concentration given is the concentration of the ferrate ion itself rather than the ferrate salt), or about 0.1 ppm to about 10 ppm, or about 1 ppm to about 5 ppm, or about 0.001 ppm or less, or less than, equal to, or greater than about 0.005 ppm, 0.01, 0.05, 0.1, 0.5, 1, 2, 3, 4, 5, 10, 15, 20, 25, 30, 40, 50, 60, 70, 80, 90, 100, 110, 120, 130, 140, 150, 160, 170, 180, 190, 200, 210, 220, 230, 240, 250, 300, 400, 500, 750 ppm, or about 1,000 ppm or more.

In some embodiments, an acidic ferrate can be used effectively to oxidize phosphorus at a lower concentration than a basic ferrate, at least partially due to the higher oxidation potential of ferrate under acidic conditions. For example, acidic ferrate can be used effectively to remove phosphorus from water (e.g., water having about 100 parts per billion total phosphorus and about 20 parts per billion dissolved reactive phosphorus concentration, with a final concentration of phosphorus of less than 10 parts per billion for both total and reactive phosphorus) at a concentration of about 0.01 ppm to about 3 ppm, or about 0.1 ppm to about 1.5 ppm, or about 0.5 ppm to about 1 ppm (e.g., about 0.01 ppm or less, or less than, equal to, or greater than 0.05, 0.1, 0.2, 0.4, 0.6, 0.8, 1, 1.2, 1.4, 1.6, 1.8, 2, 2.2, 2.4, 2.6, 2.8, or about 3 or more), while basic ferrate can be used at a higher concentration to bring about the same degree of effectiveness, such as at a concentration of about 0.1 ppm to about 5 ppm, or about 0.5 ppm to about 4 ppm, or about 1 ppm to about 3 ppm (e.g., about 0.1 ppm or less, or less than, equal to, or greater than about 0.05, 0.1, 0.2, 0.4, 0.6, 0.8, 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8, or about 5 or more). As a result of using less ferrate for phosphorus removal using acidic ferrate, the final iron concentration of the treated water after treatment with the ferrate can be lower when treated using acidic ferrate as compared to basic ferrate. For example, the final iron concentration after effective removal of phosphorus from water (e.g., water having about 100 parts per billion total phosphorus and about 20 parts per billion dissolved reactive phosphorus concentration, with a final concentration of phosphorus of less than 10 parts per billion for both total and reactive phosphorus) using acidic ferrate can be about 0.01 mg/L to about 5 mg/L, or about 0.1 mg/L to about 4 mg/L, or about 1 mg/L to about 3 mg/L, or about 1.39 mg/L, or about 0.01 mg/L or less, or less than, equal to, or greater than about 0.5 mg/L, 0.8, 0.9, 1, 1.1, 1.2, 1.3, 1.4, 1.5, 1.6, 1.8, 2, 2.5, 3, 3.5, 4, 4.5, or about 5 mg/L or more, while using basic ferrate the final iron concentration can be about 0.01 mg/L to about 3 mg/L, or about 0.05 mg/L to about 2 mg/L, or about 0.1 mg/L to less than 1 mg/L, or about 0.24 mg/L to about 0.46 mg/L, or about 0.01 mg/L or less, or less than, equal to, or greater than 0.05 mg/L, 0.1, 0.15, 0.2, 0.25, 0.3, 0.35, 0.4, 0.45, 0.5, 0.6, 0.7, 0.8, 0.9, 1, 1.2, 1.4, 1.6, 1.8, 2, 2.5 mg/L, or about 3 mg/L or more.

During the contacting of the ferrate and the oxidizable material, the reaction mixture can be can be mixed or stirred, such as by having low or high amounts of shear applied thereto. The ferrate and the oxidizable material can be contacted for any suitable period of time and at any suitable temperature such that the oxidation of a desired amount of the oxidizable material occurs. The contacting of the ferrate and the oxidizable material can include contacting for about 1 s to about 24 h, or about 10 s to about 8 h, or about 1 min to about 60 min, or about 5 min to about 15 min, or about 1 s or less, or less than, equal to, or greater than about 10 s, 30 s, 1 min, 5, 10, 15, 20, 30, 40, 50 min, 1 h, 2, 3, 4, 5, 6, 7, 8, 9, 10, 12, 14, 16, 18, 20, 22, or about 24 h or more. The contacting of the ferrate and the oxidizable material can be performed at a temperature of about greater than 0° C. to less than or equal to about 200° C., or about 1° C. to about 100° C., or about 15° C. to about 30° C., or about 1° C. or less, or less than, equal to, or greater than about 5° C., 10, 15, 20, 30, 40, 50, 60, 70, 80, 90, 95, 100, 110, 120, 150, or about 200° C. or more.

Ferrate Composition.

Various embodiments of the present invention provide a ferrate composition including ferrate ($[FeO_4]^{2-}$), such as an aqueous ferrate composition. The ferrate composition can be any ferrate-containing product formed by an embodiment of the method of generating ferrate including treatment of an iron source with an oxidizer described herein, such as in an aqueous solution having a pH of less than 7, or such as by treatment of ferric chloride with potassium permanganate, or via a different method. The ferrate composition can be a ferrate-containing product mixture formed by an embodiment of the method of generating ferrate described herein that is undiluted or that has been diluted to any degree with water. The ferrate composition can be a ferrate-containing product mixture formed by an embodiment of the method of generating ferrate described herein that has an unmodified pH or that has had acid or base added thereto to modify the pH to a desired level (e.g., more acidic, or more basic).

The ferrate composition can have any suitable pH, such as about 1 to about 14, or about 1 to about 6, or about 2 to about 5, or about 1 or less, or less than, equal to, or greater than about 2, 3, 4, 5, 6, 7, 8, 9, 10, 11, 12, 13, or about 14 or more. The ferrate composition can have a pH that is similar or equal to the pH of the ferrate starting material mixture during oxidization of the iron source with the oxidizer to form the ferrate. The ferrate composition can be an acidic ferrate composition having an acidic pH, such as about 1 to less than about 7, or about 2 to about 6, or about 1 to about 5, or about 2 to about 4, or about 2 to about 3, or about 1 or less, or less than, equal to, or greater than about 1.5, 2, 2.5, 3, 3.5, 4, 4.5, 5, 5.5, 6, or about 6.5.

The ferrate composition can have any suitable concentration of ferrate. The ferrate can be charge-balanced with any one or more suitable counterions, and can be in a form such as sodium ferrate, potassium ferrate; however, ferrate concentrations given herein refer to the concentration of the ferrate ion itself rather than the ferrate salt including the ferrate counterion. About 0.001 ppm to about 999,999 ppm of the ferrate composition can be ferrate, about 20,000 ppm to about 700,000 ppm, about 200,000 ppm to about 500,000 ppm, or about 0.001 ppm or less, or less than, equal to, or greater than about 0.005 ppm, 0.01, 0.05, 0.1, 0.5, 1, 2, 3, 4, 5, 10, 15, 20, 25, 30, 40, 50, 60, 70, 80, 90, 100, 110, 120, 130, 140, 150, 160, 170, 180, 190, 200, 210, 220, 230, 240, 250, 300, 400, 500, 750, 1,000, 5,000, 1,000, 20,000, 50,000, 100,000, 200,000, 250,000, 300,000, 350,000, 400,000, 450,000, 500,000, 550,000, 600,000, 700,000, 800,000, 900,000, or about 999,999 ppm or more.

The ferrate composition can have enhanced stability of the ferrate as compared to other compositions that include ferrate, such as compared to basic compositions including ferrate. For example, in some embodiments, the ferrate can retain at least 50% of its oxidative activity, on a mass basis (e.g., can retain at least 50% of its concentration), after 1 d to about 1 year at room temperature, or about 1 d to about 200 d, about 2 d to about 100 d, about 3 d to about 50 d, about 4 d to about 25 d, about 5 d to about 10 d, or about 5 d to about 7 d, or after less than about 1 d, or after less than, equal to, or greater than about 2d, 3, 4, 5, 10, 15, 20, 25, 30, 35, 40, 50, 60, 70, 80, 90, 100, 125, 150, 175, 200, 250, 300, or about 1 year or more.

The pH can affect the oxidation potential of the ferrate. A given concentration of ferrate at an acidic pH has a higher oxidation potential than the same concentration of ferrate at a basic pH. For example, the oxidation potential of ferrate at basic pH can be about 0.74, while the oxidation potential of ferrate at acidic pH can be about 2.2, giving an oxidation potential at acidic pH that is about three times greater than the oxidation potential at basic pH.

EXAMPLES

Various embodiments of the present invention can be better understood by reference to the following Examples which are offered by way of illustration. The present invention is not limited to the Examples given herein.

The red clay used in the Examples was obtained from a Brick manufacturer in Iowa, and had the analysis shown in Table 1.

TABLE 1

Red clay analysis.

| MATERIAL | DRY WEIGHT % | FIRED WEIGHT % |
|---|---|---|
| Loss on ignition (1050° C.) | 6.5 | |
| Silica ($SiO_2$) | 59.6 | 63.7 |
| Alumina ($Al_2O_3$) | 17.7 | 18.9 |
| Iron Oxide ($Fe_2O_3$) | 8.6 | 9.2 |
| Titanium Oxide ($TiO_2$) | 1.0 | 1.1 |
| Calcium Oxide (CaO) | 0.78 | 0.81 |
| Magnesium Oxide (MgO) | 1.9 | 2.0 |
| Potassium Oxide $K_2O$) | 3.2 | 3.5 |
| Sodium Oxide ($Na_2O$) | 0.65 | 0.70 |
| Manganese Oxide (MnO) | 0.11 | 0.12 |
| Phosphate ($P_2O_5$) | <0.25 | <0.25 |

Comparative Example A. Reactive Media

As an example of a commercially available reactive media, Table 2 illustrates the average chemical composition of comparative media A, which was Filtralite® P, an expanded clay media produced by Saint-Gobain Weber.

TABLE 2

Average chemical composition of a comparative media A, in average wt %.

| $SiO_2$ | $Al_2O_3$ | $FeO_3$ | $K_2O$ | MgO | CaO | $Na_2O$ | $TiO_2$ | C tot |
|---|---|---|---|---|---|---|---|---|
| 62% | 18% | 8% | 5% | 3% | 2% | 1% | 3% | 2% |

Comparative media A had an Si:Ca molar ratio of approximately 0.97:1, as shown in Table 3. Comparative media A had a maximum absorption capacity of 9.2 lbs (4.2 kg) of phosphorus per cubic yard (0.76 $m^3$) of comparative commercial media (0.006 g per $cm^3$), based on a 100% conversion of the calcium to a tri-calcium phosphate compound having a molar ratio of Ca:P of 1.5:1. Production of this media requires a vitrification temperature of at least about 2050° F. (1121° C.).

TABLE 3

Calculation of Si and Ca content of reactive media of comparative media A.

Comparative Prior Art Media Commercially Available

| Mass (lbs) | Component | % Purity | Cpd | Mass Si/Ca cpd (lbs) | MW Ca or Si | MW O | Total MW of Si/Ca cpd | Mass % of Si or Ca in cpd | Mass of Si or Ca in component | Moles of Si or Ca in Component |
|---|---|---|---|---|---|---|---|---|---|---|
| 250 | Clay | 62.0% | SiO2 | 155 | 28 | 16 | 60 | 0.47 | 72.33 | 2.58 |
| 250 | Clay | 2.0% | CaO | 5 | 40 | 16 | 56 | 0.71 | 3.57 | 0.09 |
| 0 | Quick Lime | 0.0% | CaO | 0 | 40 | 16 | 56 | 0.71 | 0.00 | 0.00 |
| 0 | | 0.0% | SiO2 | 0 | 28 | 16 | 60 | 0.47 | 0.00 | 0.00 |
| 0 | Water | 100.0% | Water | 70 | | | | | | |
| 0 | Peat | 100.0% | Peat | 0 | 0 | 0 | 0 | | 3.57 | |
| 250 | Total mass | | | | | | | | | |
| 250 | Mass post-vitrification, with loss of water and 10% peat as ash. | | | | Wt % Si | | 28.93% | | Moles Si | 2.58 |
| | | | | | Wt % Ca | | 1.43% | | Moles Ca | 0.09 |
| | | | | | Wt ratio Ca:Si | | 0.05 | | Mole percent Si in Ca | 0.97 |

Comparative Example B. Reactive Media

As a further example of prior art reactive media, following the procedure of U.S. Pat. No. 9,254,582, approximately 250 pounds (113 kg) of raw, wet clay with a 35% moisture content, was obtained from a fractionating sand mine and was placed in a concrete mortar mixing device and mixing was commenced. To the mixing wet clay, 25 pounds (11.3 kg) of Canadian peat was added and allowed to mix to uniformity. Once uniformly mixed, 25 pounds (11.3 kg) of quicklime with a calcium content of approximately 94 wt % CaO was added slowly so as to develop a uniform distribution throughout the mixing clay material. The mixture was allowed to mix for 10 minutes following completion of the addition of the CaO. The addition of CaO caused an exothermic reaction as the CaO was hydrated by the water contained in the mixture. Upon completion of the mixing step, the material was removed from the mixing device and allowed to cool to ambient temperature for about 2-4 hours. Once cooled to ambient temperature, the cooled mixture was extruded through a 4" (10.2 cm) extruder to form discrete pellets of approximately ⅜" (0.95 cm) diameter by approximately ½" to ¾" (1.3 cm to 1.9 cm) in length. Once extruded, the pellets were heated to approximately 2050° F. (1121° C.) with a soak time of approximately 30 minutes. The final composition of the partially vitrified pellets is shown in Table 4. Comparative media B had an Si:Ca molar ratio of approximately 0.60:1, as shown in Table 5. Comparative media B had a maximum absorption capacity of 52 lbs (23 kg) of phosphorus per cubic yard (0.76 m$^3$) of comparative commercial media (0.030 g per cm$^3$), based on a 100% conversion of the calcium to a tri-calcium phosphate compound having a molar ratio of Ca:P of 1.5:1.

TABLE 4

Average chemical composition of comparative media B, in average wt %.

| | |
|---|---|
| Aluminum | 2.0000% |
| Arsenic | 0.0022% |
| Barium | 0.0003% |
| Calcium | 8.2000% |
| Iron | 2.4000% |
| Magnesium | 0.5200% |
| Nickel | 0.0007% |
| Potassium | 0.9300% |
| Silicon | 15.7000% |
| Sodium | 0.0320% |
| Titanium | 0.0031% |

TABLE 5

Si and Ca content of reactive media of comparative media B.

Prior Art Example

| Mass (lbs) | Component | % Purity | Cpd | Mass Si/Ca cpd (lbs) | MW Ca or Si | MW O | Total MW of Si/Ca cpd | % Mass % of Si or Ca in cpd | Wt Mass of Si or Ca in component | Moles Moles of Si or Ca in Component |
|---|---|---|---|---|---|---|---|---|---|---|
| 250 | Clay | 15.7% | SiO2 | 39.25 | 28 | 16 | 60 | 0.47 | 18.32 | 0.65 |
| 250 | Clay | 0.8% | CaO | 1.95 | 40 | 16 | 56 | 0.71 | 1.39 | 0.03 |
| 25 | Quick Lime | 94.0% | CaO | 23.5 | 40 | 16 | 56 | 0.71 | 16.79 | 0.42 |
| 25 | | 6.0% | SiO2 | 1.5 | 28 | 16 | 60 | 0.47 | 0.70 | 0.03 |
| 70 | Water | 100.0% | Water | 70 | | | | | | |
| 25 | Peat | 100.0% | Peat | 25 | 0 | 0 | 0 | | 18.18 | |
| 370 | Total mass | | | | | | | | | |
| 302.5 | Mass post-vitrification, with loss of water and 10% peat as ash. | | | | Wt % Si | | 6.29% | | Moles Si | 0.68 |
| | | | | | Wt % Ca | | 6.01% | | Moles Ca | 0.45 |
| | | | | | Wt ratio Ca:Si | | 0.96 | | Mole percent Si in Ca | 0.60 |

Example 1. Production of Reactive Media

A mortar-style mixer was used in this Example, although another suitable mixing device could be used such as a paddle or ribbon blender. In the mortar mixer, 250 lbs (113 kg) of red clay having the composition described in Table 1 and having about a 5 wt % moisture content, was mixed with 25 lbs (11.3 kg) of Canadian peat, (optionally, not performed in this Example, this can be substituted or supplemented by sawdust or other combustible organic material with an ash content of less than 10 wt %), 5 lbs (2.3 kg) of quicklime with a CaO content of 94 wt % or greater, 45 lbs (20.4 kg) of dolomite containing at least 10 wt % magnesium. These materials were mixed in their native state for approximately 5 minutes after which 70 lbs (31.8 kg) of water was slowly added to form a uniformly moist mixture. This moist mixture was mixed for an additional 5 minutes and then was removed from the mixer. Upon removal of the mixture, it was fed uniformly through an extrusion device to produce a pellet. The extrusion die was considered a shearing plate die so as to avoid unnecessary compression of the pellet which could reduce its ultimate porosity. Optionally, not performed in this Example, for enhanced pellet compression, extrusion can be performed under vacuum to remove entrained air. Following the extrusion process, the resulting pellets were placed in a kiln where they were heated to a final temperature of approximately 1950° F. The final pellets had a diameter of 0.25" to 0.38" (0.64 cm to 0.95 cm) and a length of 0.25" to 1" (0.64 cm to 2.54 cm). The reactive media had a Ca:Si molar ratio of 0.81:1, as shown in Table 6.

An aqueous 50% (w/v) sodium hydroxide solution was placed into a jacketed mixing or reaction vessel. An aqueous 12.5% (w/v) sodium hypochlorite solution was added. The sodium hydroxide and sodium hypochlorite solutions were mixed as they reacted exothermically. During the reaction, the reaction vessel was cooled by means of circulating chilled water or other cooling liquid through the cooling jacket of the reaction vessel. After about 20 minutes, once the reaction mixture had cooled to approximately 95° F. (35° C.), an aqueous 40 wt % ferric chloride solution was added. The reaction mixture was stirred and another exothermic reaction occurred. The temperature was allowed to rise to a maximum of 120° F. (49° C.) and to mix for a period of 40 minutes. The ferrate concentration of the reaction mixture was measured via a spectrophotometer via the absorbance at 510 nm. The concentration of the ferrate was 20 g/L expressed as a concentration of ferrate ($FeO_4^{2-}$), corresponding to a percent yield from ferric chloride of 33%

Water at ambient temperature of approximately 82° F. (28° C.) and containing phosphorus was obtained from Lake Apopka, in Florida, and was first filtered to remove particulates using a filter having a pore size of 100 microns. Following the initial filtration, 1 to 3 ppm (measured as $FeO_4^{2-}$ of the ferrate reaction mixture) was added to the filtered water and mixing occurred in the pipe or static mixer. The mixture was then allowed to react in a mixing tank for approximately 10 minutes to oxidize the phosphorus with the ferrate. The amount of added ferrate solution was

TABLE 6

Calculation of Si and Ca content of reactive media of Example 1.

| Mass (lbs) | Component | % Purity | Cpd | Green Mixture When Quicklime/Dolomite isused | | | | % Mass % of Si or Ca in cpd | Wt Mass of Si or Ca in component | Moles Moles of Si or Ca in Component |
|---|---|---|---|---|---|---|---|---|---|---|
| | | | | Mass Si/Ca cpd (lbs) | MW Ca or Si | MW O | Total MW of Si/Ca cpd | | | |
| 250 | Clay | 59.6% | SiO2 | 149 | 28 | 16 | 60 | 0.47 | 69.53 | 2.48 |
| 250 | Clay | 0.8% | CaO | 1.95 | 40 | 16 | 56 | 0.71 | 1.39 | 0.03 |
| 5 | quick lime | 94.0% | CaO | 4.7 | 40 | 16 | 56 | 0.71 | 3.36 | 0.08 |
| 5 | quick lime | 6.0% | SiO2 | 0.3 | 28 | 16 | 60 | 0.47 | 0.14 | 0.01 |
| 50 | Dolomite | 90.0% | CaCO3 | 45 | 40 | 16 | 100 | 0.40 | 18.00 | 0.45 |
| 50 | Dolomite | 10.0% | MgO | 0 | | | | | 0.00 | 0.00 |
| 50 | Dolomite | 6.0% | SiO2 | 0 | 28 | 16 | 60 | 0.47 | 0.01 | 0.00 |
| 25 | Peat | 100.0% | Peat | 0 | | | | | 0.00 | |
| 60 | Water | 100.0% | Water | 0 | | | | | 0.00 | |
| 390 | Total mass | | | | | Wt % Si | 22.66% | | Moles Si | 2.49 |
| 307.5 | Mass post-vitrification, with loss of water and 10% peat as ash. | | | | | Wt % Ca | 7.40% | | Moles Ca | 0.57 |
| | | | | | | Ca:Si Ratio | 0.33 | | Mole percent Si in Ca | 0.81 |

Example 2. Continuous Removal of Phosphorus from Water

Materials were added to a reaction vessel according to Table 7 (i.e., aqueous solutions) to produce a starting volume of Ferrate.

TABLE 7

Ferrate starting material.

| Component | Amount |
|---|---|
| 50% (w/v) sodium hydroxide | 6000 mL |
| 12.5% (w/v) sodium hypochlorite | 3000 mL |
| 40 wt % $FeCl_3$ | 1000 mL | determined experimentally using a 6 gang Phipps and Bird gang stirrer. Additions ranging from 0.25 ppm to 5 ppm were evaluated and the effective addition was found to be 1-3 ppm (e.g., concentration of ferrate with effective phosphorus removal wherein increased concentration of ferrate results in little to no increased phosphorus removal). Due to the basicity of the ferrate reaction mixture, the addition of the ferrate reaction mixture caused an increase in the pH of the water including the phosphorus to approximately 10.5.

An aqueous 50% (w/v) sodium hydroxide solution was added to the ferrate-treated water (oxidized water) to elevate the pH to approximately 10.8 prior to introduction into 4 parallel, 8" (20.3 cm) diameter reactive media columns with a bed depth of approximately 48" (121.9 cm). The amount of base was controlled continuously using a Hach SC200 Ph Controller with a set point of 10.8. The oxidized and pH-adjusted water was then fed to the columns of reactive media described above using a flow rate of approximately 10 GPM (37.9 LPM), which was about 7.2 gallons (27.3 L) per minute per square foot (0.093 m³) of media cross-sectional area.

Following passage through the reactive media column, the treated water was again filtered using a filter having a pore size of 1 micron to capture any particulate phosphorus that escaped the media column. Following this final filtration, the water was neutralized to meet the necessary discharge requirements to a pH of less than 8.5 with citric acid. Total and dissolved reactive phosphorus concentrations were measured using a Hach Model DR 6000 spectrophotometer and utilizing the standard analytical method associated therewith which are EPA 365.1, 365.2, 365.3, and 356.4 compliant.

Phosphorus removal was measured by comparing both total and dissolved phosphorus concentrations of the incoming water with those of the treated water. The incoming water had approximately 100 parts per billion total phosphorus and about 20 parts per billion dissolved reactive phosphorus. The water following treatment measured in the undetectable range (less than 10 ppb) for both total and dissolved reactive phosphorus. The treated water had an iron concentration of 1.39 mg/L. The reactive media of the present Example had a maximum absorption capacity of 55 lbs (25 kg) of phosphorus per cubic yard (0.76 m³) of comparative commercial media (0.033 g per cm³), based on a 100% conversion of the calcium to a tri-calcium phosphate compound having a molar ratio of Ca:P of 1.5:1.

Example 3. Stability of Ferrate Formed via Basic Ferrate Starting Material Mixture Ferrate produced by the method described in Example 2 has been found to be stable for a limited amount of time. Typically the ferrate solution degraded such that the $FeO_4^{2-}$ concentration was reduced by 50 wt % within about 4-6 hours necessitating a frequent make up cycle and a need for on-site synthesis equipment. A sample of the ferrate reaction mixture of Example 2 was removed and was monitored for ferrate concentration over time at room temperature, without shielding the solution from light, with the results given in Table 8. The concentration was determined by determining the absorbance at 510 nanometers and applying the Beer-Lambert equation for calculating concentration therefrom. The measurement was carried out using an Ocean Optics spectrophotometer.

TABLE 8

Strength of ferrate reaction mixture of Example 2 over time at room temperature.

| Time (h:m) | Ferrate concentration (g/L) | % Degradation |
|---|---|---|
| 0:00 | 18.9 | 0 |
| 1:00 | 18.5 | 2.1% |
| 2:10 | 16.6 | 14% |
| 6:06 | 9 | 52% |

Example 4. Small Scale Formation of Ferrate from Ferric Chloride and Potassium Permanganate A solution of 38-42% (w/v) $FeCl_3$ in water (2.5 g, 1.82 mL, 1 g $FeCl_3$, 6.17 mmol $FeCl_3$) and having a pH of about 2 (due to about 5 wt % of 37% w/w HCl in solution, or about 1.5 wt % HCl) was added to a 50 mL beaker, along with a stir bar, and was set on a stir plate which was then set to stir at 300 RPM, which was sufficient to mix to homogeneity. Potassium permanganate (99% purity, 0.5 g raw material, 0.495 g $KMnO_4$, 3.13 mmol $KMnO_4$) was added. The reaction mixture was allowed to react for 5 minutes while mixing. DI water (10 mL) was added at the end of the stirring, to prevent formation of a paste. The pH of the reaction mixture was 2.3.

Deionized (DI) water (50 g) was measured on a balance. About 0.06 g to 0.08 g of the reaction mixture was added to the DI water. Shortly afterwards, absorbance of a sample of the ferrate solution was measured on an Ocean Optics Spectrophotometer at 510 nm and at 525 nm. The absorbances were 0.58 at 510 nm and 0.74 at 525 nm, indicating a concentration of ferrate in the sample analyzed of about 52.6 g/L, representing an initial concentration of ferrate in the reaction mixture, of about 315.6 g/L, or about 2.64 M, and indicating a total yield of ferrate of 631.2 mg or 5.28 mmol, which was 84.85% yield from the ferric chloride.

Example 5. Large Scale Formation of Ferrate from Ferric Chloride and Potassium Permanganate A solution of 38-42% (w/v) $FeCl_3$ in water (50 g, 36.4 mL, 20 g $FeCl_3$, 123.3 mmol $FeCl_3$) and having a pH of about 2 (due to about 5 wt % of 37% w/w HCl in solution, or about 1.5 wt % HCl) was added to a 600 mL beaker, along with a stir bar, and was set on a stir plate which was then set to stir at 1000 RPM, which was sufficient to mix to homogeneity. Potassium permanganate (99% purity, 10 g raw material, 9.9 g $KMnO_4$, 62.6 mmol $KMnO_4$) was added. The reaction mixture was allowed to react for 5 minutes while mixing. The pH of the reaction mixture was 2.3. DI water (200 mL) was added at the end of the stirring, to prevent formation of a paste.

Deionized (DI) water (50 g) was measured on a balance. About 0.06 g to 0.08 g of the reaction mixture was added to the DI water. Shortly afterwards, absorbance of a sample of the ferrate solution was measured on an Ocean Optics Spectrophotometer at 510 nm and at 525 nm. The absorbances were 0.58 at 510 nm and 0.67 at 525 nm, indicating a concentration of ferrate in the sample analyzed of about 53.2 g/L, or about 0.44 M, and a total concentration of ferrate in the reaction mixture of about 319.4 g/L, or about 2.66 M, indicating a total yield of ferrate of, which was 84.45% yield from the ferric chloride.

Example 6. Stability of Ferrate Formed from Ferric Chloride and Potassium Permanganate Ferrate produced by the method described in Example 4 was monitored for ferrate concentration over time at room temperature, without shielding the solution from light, with the results given in Table 9. The concentration was determined by determining the absorbance at 510 nanometers and applying the Beer-Lambert equation for calculating concentration therefrom.

TABLE 9

Strength of ferrate reaction mixture of Example 4 over time at room temperature.

| Run | Time (days) | Ferrate concentration (g/L) | % Degradation |
|---|---|---|---|
| 1 | 0 | 209.40 | 0% |
|  | 5 | 186.13 | 11% |
|  | 6 | 183.88 | 12% |
|  | 7 | 176.38 | 16% |

TABLE 9-continued

Strength of ferrate reaction mixture of
Example 4 over time at room temperature.

| Run | Time (days) | Ferrate concentration (g/L) | % Degradation |
|---|---|---|---|
| 2 | 0 | 256.0071 | 0% |
|   | 1 | 234.6731 | 8% |
|   | 2 | 185.8719 | 28% |
|   | 4 | 159.2299 | 38% |
|   | 13 | 98.08137 | 64% |

Example 7. Oxidation-Reduction Potential (ORP)

Ferrate exhibits low oxidation potential when in a basic environment, and high oxidation potential in acidic environments. A significant disadvantage of conventional ferrate mixtures is that they are only stable in basic solution, and in particular, ferrates formed according to Example 2 above has a solution pH of about 12.2 and when even small amounts are added to an aqueous solution, the aqueous solution pH is immediately raised to approximately 10.5, a pH where ferrate has a lower oxidation potential. By comparison, the process of producing ferrate from ferric chloride and potassium permanganate in an acidic medium described in Examples 4 and 5 herein generate a ferrate solution having a pH of approximately 3.5 to 4.0. When added in small amounts to an aqueous solution, the resulting pH of the aqueous solution remains below 7, or at least slightly acidic. To illustrate the importance of this relationship, acidic ferrate solutions prepared according to Examples 4 and 5 above were prepared, and about 0.072 grams of each ferrate solution were added to 50 grams of distilled water, to form two different diluted ferrate solutions. The starting pH and ORP were measured and recorded for each solution. A solution of 5% sodium hydroxide was then added dropwise to raise the pH. The adjusted solution was allowed to mix until the pH reading was stable. The ORP meter was placed in the solution and allowed to stabilize for 2 minutes and the reading was recorded. The ORP was measured using an Oakton Model 10 ORP Meter. Similarly, approximately 0.072 grams of basic ferrate solution, produced according to Example 2 above was placed in 50 grams of distilled water. The starting pH and ORP were measured and recorded. A solution of 5% sulfuric acid was then added dropwise to lower the pH. The adjusted solution was allowed to mix until the pH reading was stable. The ORP meter was placed in the solution and allowed to stabilize for 2 minutes and the reading recorded. The ORP was measured using an Oakton Model 10 ORP Meter. Table 10 shows the individual pH and corresponding ORP measurements of acidic and basic ferrate solutions during pH modification.

TABLE 10

Oxidation reduction potential and pH of acidic and
basic ferrate solutions at various pH.

| Starting with acidic ferrate solution | | Starting with basic ferrate solution | |
|---|---|---|---|
| pH | ORP | pH | ORP |
| 3.38 | 927 | 12.49 | 338 |
| 3.86 | 892 | 12.3 | 394 |
| 4.1 | 878 | 12.06 | 421 |
| 5.5 | 741 | 11.28 | 491 |
| 6.26 | 730 | 10.51 | 534 |
| 9.72 | 617 | | |
| 9.13 | 653 | | |
| 8.52 | 702 | | |

Example 8. Continuous Removal of Phosphorus from Water Using Acidic Ferrate

Example 2 was repeated, but acidic ferrate formed via the method of Example 5 was used instead of the basic ferrate formed from sodium hydroxide, sodium hypochlorite, and ferric chloride. Instead of the effective concentration of 1-3 ppm ferrate used in Example 2, the effective concentration of the acidic ferrate was found to be 0.5-1 ppm. After oxidation of the phosphorus with the acidic ferrate, a greater amount of the aqueous 50% (w/v) sodium hydroxide solution needed to be added (as compared to Example 2) to basify the reaction mixture to pH 10.8 prior to flowing through the reactive media. An at least equivalent amount of phosphorus oxidation and removal was achieved using the acidic ferrate, as compared to Example 2; however, the final treated water from the acidic ferrate procedure had a lower final iron concentration of 0.24-0.46 mg/L.

Example 9. Continuous Removal of Phosphorus from Water Using Ferric Chloride as an Oxidizer Example 2 was repeated, but ferric chloride as an aqueous 40 wt % solution was used instead of the basic ferrate formed from sodium hydroxide, sodium hypochlorite, and ferric chloride. The effective concentration of the ferric chloride was found to be 1-3 ppm. Prior to the addition of ferric chloride, approximately 2 ppm of sodium hypochlorite was added to assist with the oxidation of the phosphorus (without sodium hypochlorite, 3-4 ppm ferric chloride was needed to achieve the same results). After oxidation of the phosphorus with the sodium hypochlorite and ferric chloride, an amount of the aqueous 50% (w/v) sodium hydroxide solution was added to basify the reaction mixture to pH 10.8 prior to flowing through the reactive media. An at least equivalent amount of phosphorus oxidation and removal was achieved using the sodium hypochlorite and ferric chloride, as compared to Example 2; however, the final treated water from the acidic ferrate procedure had a lower final iron concentration of 0.68 mg/L.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Exemplary Embodiments

The following exemplary embodiments are provided, the numbering of which is not to be construed as designating levels of importance:

Embodiment 1 provides a method of making ferrate, the method comprising:

treating an iron source with an oxidizer in an aqueous solution having a pH of less than 7 under conditions sufficient to form ferrate.

Embodiment 2 provides the method of Embodiment 1, wherein the treatment of the iron source with the oxidizer forms a ferrate composition that is an aqueous composition comprising the ferrate.

Embodiment 3 provides the method of Embodiment 2, wherein the aqueous composition comprising the ferrate has a pH of about 1 to about 6.

Embodiment 4 provides the method of any one of Embodiments 2-3, wherein the aqueous composition comprising the ferrate has a pH of about 2 to about 4.

Embodiment 5 provides the method of any one of Embodiments 2-4, wherein the ferrate is about 0.001 ppm to about 999,999 ppm of the aqueous composition comprising the ferrate.

Embodiment 6 provides the method of any one of Embodiments 2-5, wherein the ferrate is about 200,000 ppm to about 500,000 ppm of the aqueous composition comprising the ferrate.

Embodiment 7 provides the method of any one of Embodiments 1-6, wherein the aqueous solution comprising the iron source and the oxidizer has a pH of about 1 to about 7.

Embodiment 8 provides the method of any one of Embodiments 1-7, wherein the aqueous solution comprising the iron source and the oxidizer has a pH of about 2 to about 5.

Embodiment 9 provides the method of any one of Embodiments 1-8, wherein the ferrate is formed from the iron source with a yield of about 0.01% to about 100%.

Embodiment 10 provides the method of any one of Embodiments 1-9, wherein the ferrate is formed from the iron source with a yield of about 40% to about 90%.

Embodiment 11 provides the method of any one of Embodiments 1-10, wherein the ferrate is formed from the iron source with a selectivity of about 0.01% to about 100%.

Embodiment 12 provides the method of any one of Embodiments 1-11, wherein the ferrate is formed from the iron source with a selectivity of about 60% to about 100%.

Embodiment 13 provides the method of any one of Embodiments 1-12, wherein the aqueous solution comprising the iron source and the oxidizer has a mole ratio of the oxidizer to the iron source of about 1:100 to about 100:1.

Embodiment 14 provides the method of any one of Embodiments 1-13, wherein the aqueous solution comprising the iron source and the oxidizer has a mole ratio of the oxidizer to the iron source of about 1:5 to about 5:1.

Embodiment 15 provides the method of any one of Embodiments 1-14, wherein the aqueous solution comprising the iron source and the oxidizer has a molar ratio of the oxidizer to the iron source of about 1:1 to about 1:3.

Embodiment 16 provides the method of any one of Embodiments 1-15, wherein the oxidizer comprises ferric chloride ($FeCl_3$), potassium permanganate, potassium dichromate, potassium chlorate, potassium persulfate, sodium persulfate, perchloric acid, peracetic acid, potassium monopersulfate, hydrogen peroxide, sodium hypochlorite, potassium hypochlorite, ozone, or a combination thereof.

Embodiment 17 provides the method of any one of Embodiments 1-16, wherein the oxidizer is potassium permanganate.

Embodiment 18 provides the method of any one of Embodiments 1-17, wherein the oxidizer is about 10 wt % to about 60 wt % of the total amount of the oxidizer and the iron source.

Embodiment 19 provides the method of any one of Embodiments 1-18, wherein the oxidizer is about 25 wt % to about 40 wt % of the total amount of the oxidizer and the iron source.

Embodiment 20 provides the method of any one of Embodiments 1-19, wherein the iron source comprises ferric chloride ($FeCl_3$), ferric bromide, ferrous chloride, ferrous bromide, ferric nitrate, ferrous nitrate, ferric sulfate, ferrous sulfate, ferric phosphate, ferrous phosphate, ferric oxides, ferrous oxides, ferric carbonate, ferrous carbonate, or a combination thereof.

Embodiment 21 provides the method of any one of Embodiments 1-20, wherein the iron source is ferric chloride ($FeCl_3$).

Embodiment 22 provides the method of any one of Embodiments 1-21, wherein the iron source is about 40 wt % to about 90 wt % of the total amount of the oxidizer and the iron source.

Embodiment 23 provides the method of any one of Embodiments 1-22, wherein the iron source is about 60 wt % to about 70 wt % of the total amount of the oxidizer and the iron source.

Embodiment 24 provides the method of any one of Embodiments 1-23, wherein a ferrate starting material mixture comprises the iron source and the oxidizer.

Embodiment 25 provides the method of Embodiment 24, comprising heating the ferrate starting material mixture, or allowing the ferrate starting material mixture to heat, to form the ferrate.

Embodiment 26 provides the method of any one of Embodiments 24-25, comprising heating or allowing the ferrate starting material mixture to heat to a temperature of about 10° C. to about 500° C.

Embodiment 27 provides the method of any one of Embodiments 24-26, comprising heating or allowing the ferrate starting material mixture to heat to a temperature of about 10° C. to about 30° C.

Embodiment 28 provides the method of any one of Embodiments 24-27, wherein the ferrate starting material further comprises an acid.

Embodiment 29 provides the method of Embodiment 28, wherein the acid comprises a mineral acid, an organic acid, or a combination thereof.

Embodiment 30 provides the method of any one of Embodiments 28-29, wherein the acid comprises phosphoric acid, sulfuric acid, hydrochloric acid, acetic acid, or a combination thereof.

Embodiment 31 provides the method of any one of Embodiments 28-30, wherein the acid is hydrochloric acid.

Embodiment 32 provides the method of any one of Embodiments 24-31, wherein water is about 1 wt % to about 99.99 wt % of the ferrate starting material.

Embodiment 33 provides the method of any one of Embodiments 24-32, wherein water is about 10 wt % to about 95 wt % of the ferrate starting material.

Embodiment 34 provides the method of any one of Embodiments 1-33, further comprising contacting the ferrate and an oxidizable material to form an oxidized material.

Embodiment 35 provides the method of Embodiment 34, wherein the oxidizable material is phosphorus, bacteria, organic material, or a combination thereof.

Embodiment 36 provides the method of any one of Embodiments 34-35, wherein the oxidizable material is phosphorus.

Embodiment 37 provides the method of any one of Embodiments 1-36, wherein the contacting of the ferrate and the oxidizable material occurs in a reaction mixture comprising the ferrate and the oxidizable material.

Embodiment 38 provides the method of Embodiment 37, wherein the reaction mixture comprising the ferrate and the oxidizable material has a pH of about 1 to about 14.

Embodiment 39 provides the method of any one of Embodiments 37-38, wherein the reaction mixture comprising the ferrate and the oxidizable material has a pH of about 5 to about 7.

Embodiment 40 provides the method of any one of Embodiments 37-39, wherein the ferrate is about 0.001 ppm to about 1,000 ppm of the reaction mixture comprising the ferrate and the oxidizable material.

Embodiment 41 provides the method of any one of Embodiments 37-40, wherein the ferrate is about 0.1 ppm to about 10 ppm of the reaction mixture comprising the ferrate and the oxidizable material.

Embodiment 42 provides the method of any one of Embodiments 34-41, wherein the contacting of the ferrate and the water comprising the oxidizable material comprises contacting under shear.

Embodiment 43 provides the method of any one of Embodiments 34-42, wherein the contacting of the ferrate and the water comprising the oxidizable material comprises contacting for about 1 s to about 24 h.

Embodiment 44 provides the method of any one of Embodiments 34-43, wherein the contacting of the ferrate and the oxidizable material is performed at a temperature of greater than 0° C. to less than or equal to about 200° C.

Embodiment 45 provides the method of any one of Embodiments 34-44, wherein the contacting of the ferrate and the oxidizable material is performed at a temperature of about 15° C. to about 30° C.

Embodiment 46 provides a ferrate composition comprising ferrate made by the method of any one of Embodiments 1-45.

Embodiment 47 provides a method of making ferrate, the method comprising:
treating ferric chloride with an oxidizer in an aqueous solution comprising HCl and having a pH of about 1 to about 5 under conditions sufficient to form ferrate, wherein the ferric chloride and the oxidizer have a molar ratio of about 1:1 to about 1:3.

Embodiment 48 provides a method of making ferrate, the method comprising:
treating ferric chloride with potassium permanganate in an aqueous solution under conditions sufficient to form ferrate.

Embodiment 49 provides the method of Embodiment 48, wherein the aqueous solution comprising the ferric chloride and the potassium permanganate has a pH of about 1 to about 14.

Embodiment 50 provides a ferrate composition comprising ferrate made by the method of any one of Embodiments 47-49.

Embodiment 51 provides an aqueous ferrate composition comprising:
ferrate ($[FeO_4]^{2-}$), the aqueous ferrate composition having a pH of less than 7.

Embodiment 52 provides the aqueous ferrate composition of Embodiment 51, wherein the ferrate retains at least 50% of its oxidative activity, on a mass basis, after about 1 days to about 1 year at room temperature.

Embodiment 53 provides the aqueous ferrate composition of any one of Embodiments 51-52, wherein the ferrate retains at least 50% of its oxidative activity, on a mass basis, after 5 days to about 7 days at room temperature.

Embodiment 54 provides the aqueous ferrate composition of any one of Embodiments 51-53, wherein the ferrate is about 0.001 ppm to about 999,999 ppm of the aqueous ferrate composition.

Embodiment 55 provides the aqueous ferrate composition of any one of Embodiments 51-54, wherein the ferrate is about 200,000 ppm to about 500,000 ppm of the aqueous ferrate composition.

Embodiment 56 provides the aqueous ferrate composition of any one of Embodiments 51-55, wherein the aqueous ferrate composition has a pH of about 1 to less than about 7.

Embodiment 57 provides the aqueous ferrate composition of any one of Embodiments 51-56, wherein the aqueous ferrate composition has a pH of about 2 to about 4.

Embodiment 58 provides an aqueous ferrate composition comprising:
ferrate ($[FeO_4]^{2-}$), the aqueous ferrate composition having a pH of about 1.5 to about 3, wherein the ferrate is about 200,000 to about 400,000 ppm of the aqueous ferrate composition, wherein the ferrate retains at least 50% of its oxidative activity, on a mass basis, after about 5 to about 7 days at room temperature.

Embodiment 59 provides the method, ferrate composition, or aqueous ferrate composition of any one or any combination of Embodiments 1-58 optionally configured such that all elements or options recited are available to use or select from.

What is claimed is:

1. A method of making ferrate, the method comprising:
treating ferric chloride ($FeCl_3$) with an oxidizer in an aqueous solution having a pH of about 1 to about 5 under conditions sufficient to form an aqueous composition comprising ferrate;
wherein
the ferric chloride and the oxidizer have a molar ratio of about 1:1 to about 1:3, and
the oxidizer comprises potassium permanganate, potassium dichromate, potassium chlorate, potassium persulfate, sodium persulfate, perchloric acid, peracetic acid, potassium monopersulfate, hydrogen peroxide, sodium hypochlorite, potassium hypochlorite, ozone, or a combination thereof.

2. The method of claim 1, wherein the oxidizer is potassium permanganate.

3. The method of claim 1, wherein a ferrate starting material mixture comprises the iron source and the oxidizer.

4. The method of claim 3, comprising heating the ferrate starting material mixture, or allowing the ferrate starting material mixture to heat, to form the ferrate.

5. The method of claim 3, wherein the ferrate starting material further comprises an acid.

6. The method of claim 1, further comprising contacting the ferrate and an oxidizable material to form an oxidized material.

7. The method of claim 6, wherein the oxidizable material is phosphorus, bacteria, organic material, or a combination thereof.

8. The method of claim 6, wherein the contacting of the ferrate and the oxidizable material occurs in a reaction mixture comprising the ferrate and the oxidizable material.

9. The method of claim 8, wherein the reaction mixture comprising the ferrate and the oxidizable material has a pH of about 5 to about 7.

10. A method of making ferrate, the method comprising:
treating ferric chloride with an oxidizer in an aqueous solution comprising HCl and having a pH of about 1 to about 5 under conditions sufficient to form ferrate, wherein the ferric chloride and the oxidizer have a molar ratio of about 1:1 to about 1:3.

11. The method of claim 10, wherein the oxidizer is potassium permanganate.

12. A method of making ferrate, the method comprising:
treating an iron source with an oxidizer in an aqueous solution having a pH of less than 7 under conditions sufficient to form an aqueous ferrate composition comprising ferrate ($[FeO_4]^{2-}$), the aqueous ferrate composition having a pH of less than 7.

13. The method of claim 12, wherein the:
aqueous ferrate composition has a pH of about 1.5 to about 3, the ferrate is about 200,000 to about 400,000 ppm of the aqueous ferrate composition, and the ferrate retains at least 50% of its oxidative activity, on a mass basis, after about 5 to about 7 days at room temperature.

* * * * *

UNITED STATES PATENT AND TRADEMARK OFFICE
CERTIFICATE OF CORRECTION

PATENT NO. : 11,530,137 B2  
APPLICATION NO. : 16/650954  
DATED : December 20, 2022  
INVENTOR(S) : Luke et al.

Page 1 of 1

It is certified that error appears in the above-identified patent and that said Letters Patent is hereby corrected as shown below:

On the Title Page

On page 2, in Column 1, under item (56) "Other Publications", Line 21, delete "phosphrus" and insert --phosphorus-- therefor In the Specification In Column 1, Line 9, delete "2018." and insert --2018,-- therefor In Columns 11-12, in Table 3, Line 7, delete "SiO2" and insert --$SiO_2$-- therefor In Columns 11-12, in Table 3, Line 10, delete "SiO2" and insert --$SiO_2$-- therefor In Columns 11-12, in Table 5, Line 7, delete "SiO2" and insert --$SiO_2$-- therefor In Columns 11-12, in Table 5, Line 10, delete "SiO2" and insert --$SiO_2$-- therefor In Columns 13-14, in Table 6, Line 7, delete "SiO2" and insert --$SiO_2$-- therefor In Columns 13-14, in Table 6, Line 10, delete "SiO2" and insert --$SiO_2$-- therefor In Columns 13-14, in Table 6, Line 11, delete "CaCO3" and insert --$CaCO_3$-- therefor In Columns 13-14, in Table 6, Line 13, delete "SiO2" and insert --$SiO_2$-- therefor In the Claims In Column 23, Line 24, in Claim 13, delete "the:" and insert --the-- therefor In Column 23, Line 25, in Claim 13, before "aqueous", delete a linebreak Signed and Sealed this  
Twenty-eighth Day of November, 2023

Katherine Kelly Vidal  
*Director of the United States Patent and Trademark Office*